May 29, 1962   F. L. JOHNSON   3,036,554
PROTECTIVE DEVICES FOR DOGS
Filed Feb. 24, 1959

INVENTOR.
Frank L. Johnson
BY Gerald B. Tjoflat
His attorney

United States Patent Office 3,036,554
Patented May 29, 1962

3,036,554
PROTECTIVE DEVICES FOR DOGS
Frank L. Johnson, 4035 Haverstraw Drive,
Cincinnati 42, Ohio
Filed Feb. 24, 1959, Ser. No. 795,242
1 Claim. (Cl. 119—96)

This invention relates to devices for protecting animals, particularly dogs, against self-inflicted injury by chewing or biting themselves.

It is well known that dogs often chew on themselves and pull out hair by their teeth. Such behavior can result in serious damage.

Dogs which have been injured do not take kindly to medication or the application of bandages or splints. Dogs have been known to remove medication applied to afflicted areas, as well as bandages or splints, as fast as the same can be applied, unless restrained in some way. Their intolerance of bandages is the more pronounced if infection has set in.

In a particular case, a dog had been struck by an automobile and his tail injured so badly that about half of it had to be amputated, dressed and bandaged. While the dog was left unattended, he removed the bandages and so severely chewed the tail that a second amputation had to be performed.

An object of this invention is to provide a protective device of such form and construction that it can be applied as a collar to protect animals such as dogs from self-inflicted injury caused by chewing and gnawing on themselves.

Another object is to provide a device as above set forth that is of simple construction, has a low manufacturing cost, and will effectively and efficiently accomplish the intended purpose.

A still further object is to provide a device as above set forth, that is so formed that when placed on a dog's neck and fastened, it takes the form of a truncated cone with the base of the cone extending forwardly in the direction of the dog's mouth, thereby forming a barrier between the dog's mouth and any part of his body upon which he desired to chew or gnaw or to bite himself.

Other objects of the invention will be apparent to those of ordinary skill in the art to which the invention pertains, from the following description taken in conjunction with the accompanying drawings.

Figure 1:
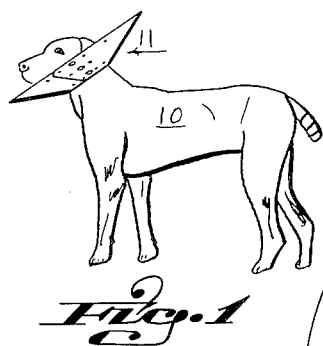
FIGURE 1 is a sketch of a dog having about its neck a protective device arranged and constructed in accordance with an embodiment of the invention.

As shown in FIG. 1, a dog 10 is provided with a protective device or collar 11 embodying what now appears to be a preferred form of the invention. When the collar is in place, it has the shape of a truncated cone that tapers outwardly and forwardly towards the dog's mouth. The diameter of the base of the cone is such that the collar forms a barrier between the dog's mouth and any part of the body which he could normally reach to chew or bite with his teeth. The dog shown in FIG. 1 has a bandaged tail. When wearing the collar 11, the dog cannot bite or re-injure the member.

Figure 2:
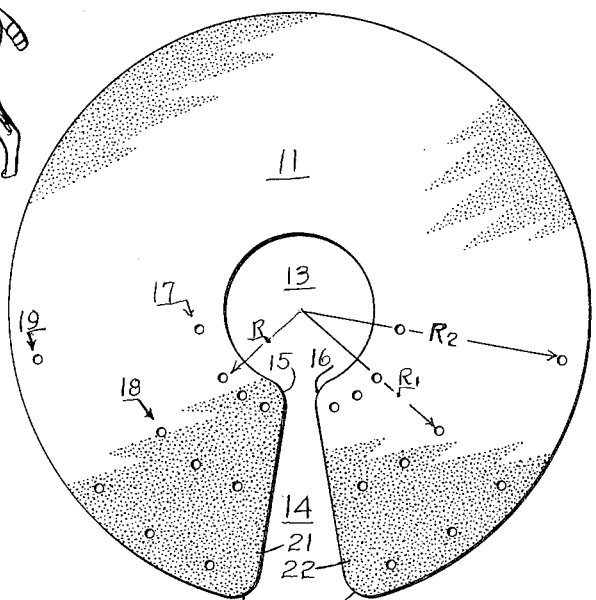
FIGURE 2 is a plan view of the device laid out in the flat.

FIGURE 2 shows the collar in its flat condition and illustrates a mode of constructing it.

The collar is preferably formed from a flexible sheet composed of a material selected from the group consisting of rubber, elastomers, and suitable flexible plastic material. It is preferred to form a circular blank with a circular aperture 13 at its center. A pie-shaped piece is cut out of the blank to form a slot 14, the sides of which taper from the outer edge of the blank towards the center of the aperture 13. The ends of the sides of the slot may be rounded as at 15—15 and 16—16.

In order that the collar may be secured with laces or staples after it has been placed on the dog's neck, the blank is provided with concentrically arranged rows 17, 18 and 19 of holes. As shown, the holes are so arranged that they are in radial alignment and the spacings in any row are equal. With such an arrangement of holes, the collar can be adjusted to the size of the dog's neck. Likewise, the angle of the cone can be changed within the limits allowed by the pattern of the holes, the diameter of the central aperture and the size of the dog's neck.

Figure 3:
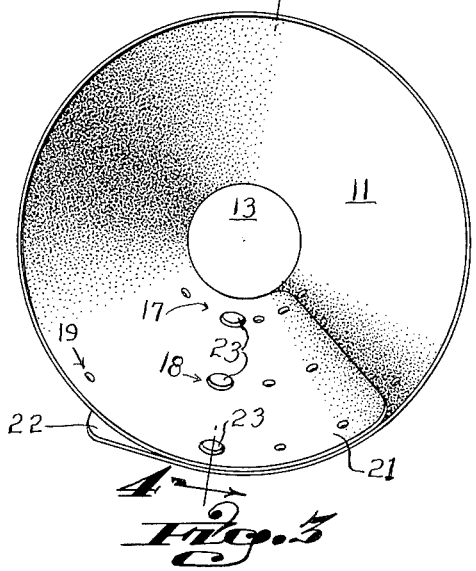
FIG. 3 is a view illustrating the manner in which the collar is manipulated to properly fit it to a dog's neck.
Figure 4:
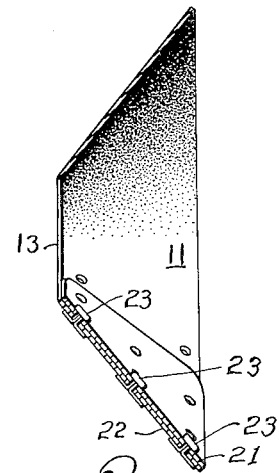
FIG. 4 is a view in section taken on line 4—4 of FIG. 3.

The collar may be placed about the dog's neck by bending the ends 21 and 22 in opposite directions. When in place, the ends 21 and 22 are overlapped as shown in FIG. 3, to the extent necessary. When properly overlapped, holes in radial rows will register to receive fasteners 23 or a lace of any suitable form. The collar can be made smaller by increasing the amount of overlap of the ends 21 and 22. As the overlap is increased, two or more sets of holes in each concentric row will register as illustrated in FIG. 3.

As shown in FIG. 2, the inner concentric row of holes is located at radius R from the center of the aperture 13. The next two rows of concentric holes are located at distances R1 and R2, respectively, from the center of aperture 13. Also, as shown in FIG. 2, correspondingly placed holes in the concentric rows lie on a radius extending from the center of the aperture 13 to the outer edge of the blank. Thus, the spacings of the holes in the concentric rows are such as to register as the ends of the collar blank are overlapped to fit it to a dog.

A protective collar such as shown and described supra is light in weight and can be conveniently applied to a dog. It is also so designed and shaped that it provides an efficient barrier so that a dog wearing such a collar cannot bite or chew himself. Thus, as illustrated in FIG. 1, the collar prevents the dog from removing the bandages on his tail and aggravating the damage.

Having thus described the invention, it will be apparent to those of ordinary skill in the art, that the illustrated embodiment may be modified or changed without departing from the spirit or the scope of the invention.

Therefore, what is claimed and desired to be secured by Letters Patent is:

A protective collar for a dog or other small animal comprising a sheet of normally flat material having a substantially circular periphery and a substantially circular central opening, said sheet having a slot extending from the central opening outwardly to provide two opposed ends of said sheet, said ends having complementary openings therethrough, and said ends being overlapped, and fastening means extending through at least some of said complementary openings, to form a collar of substantially truncated conical form.

References Cited in the file of this patent
UNITED STATES PATENTS
2,233,832 Byrd ------------------ Mar. 4, 1941

OTHER REFERENCES
Wailing Lemur, Jan. 17, 1938, page 22 of the "Washington Herald."